US009395511B1

(12) United States Patent
 Code

(10) Patent No.: US 9,395,511 B1
(45) Date of Patent: Jul. 19, 2016

(54) VOICE COIL ACTUATOR WITH INTEGRATED LVDT

(71) Applicant: Magnet-Schultz of America, Inc., Westmont, IL (US)

(72) Inventor: Kevin Code, Buffalo Grove, IL (US)

(73) Assignee: Magnet-Schultz of America, Inc., Westmont, IL (US)

( * ) Notice: Subject to any disclaimer, the term of this patent is extended or adjusted under 35 U.S.C. 154(b) by 12 days.

(21) Appl. No.: 14/605,371

(22) Filed: Jan. 26, 2015

Related U.S. Application Data

(60) Provisional application No. 61/933,374, filed on Jan. 30, 2014.

(51) Int. Cl.
 *G01B 7/14* (2006.01)
 *G02B 7/08* (2006.01)
 *H02K 41/02* (2006.01)

(52) U.S. Cl.
 CPC . *G02B 7/08* (2013.01); *H02K 41/02* (2013.01)

(58) Field of Classification Search
 CPC ........................................................ G01B 7/14
 USPC ................................................... 324/207.18
 See application file for complete search history.

(56) References Cited

U.S. PATENT DOCUMENTS

| 4,153,370 | A | 5/1979 | Corey, III |
| 4,808,955 | A | 2/1989 | Godkin et al. |
| 4,888,506 | A | 12/1989 | Umehara et al. |
| 5,149,996 | A | 9/1992 | Preston et al. |
| 5,332,881 | A | 7/1994 | Topkaya et al. |
| 5,401,948 | A | 3/1995 | Krichever et al. |
| 5,442,167 | A | 8/1995 | Cornelius et al. |
| 5,978,172 | A | 11/1999 | Nayak et al. |
| 6,246,230 | B1 | 6/2001 | Mednikov |
| 6,593,540 | B1 | 7/2003 | Baker et al. |
| 6,856,049 | B2 | 2/2005 | Hirata |
| 6,870,285 | B2 | 3/2005 | Godkin |
| 7,675,202 | B1 | 3/2010 | Huang |
| 8,079,960 | B2 | 12/2011 | Briggs et al. |
| 8,296,856 | B2 | 10/2012 | Humphris et al. |
| 2006/0055252 | A1 | 3/2006 | Tseng |
| 2008/0297922 | A1 | 12/2008 | Lule |
| 2010/0249764 | A1 | 9/2010 | Nishida |
| 2012/0067352 | A1 | 3/2012 | Gruber et al. |
| 2012/0092652 | A1 | 4/2012 | Chuang |
| 2013/0088217 | A1 | 4/2013 | Grosse et al. |
| 2013/0141081 | A1 | 6/2013 | Pfaffinger et al. |

*Primary Examiner* — Bot Ledynh
(74) *Attorney, Agent, or Firm* — Knechtel, Demeur, Samlan

(57) ABSTRACT

A device for focusing a laser in which a voice coil and LVDT are mounted in parallel alignment with each other and have a common centrally disposed armature. A central bore extends through the armature. A lens is mounted at one end of the armature and a laser is located at the opposite end. The laser beam passes through the central bore and is focused by the voice coil moving the armature which in turn moves the lens. The LVDT accurately positions the armature to focus the laser beam.

12 Claims, 2 Drawing Sheets

VOICE COIL ACTUATOR WITH INTEGRATED LVDT

CROSS REFERENCE TO RELATED APPLICATION

This application claims priority of provisional patent application Ser. No. 61/933,374 filed Jan. 30, 2014.

FIELD OF THE INVENTION

This invention relates to a voice coil actuator with a position feedback sensing capability to accurately position a lens mounted on a moveable tube.

BACKGROUND AND SUMMARY OF THE INVENTION

In the past, stepping motors have been used to position a lens barrel and associated lens in medical positioning apparatus. The problem with a stepping motor with position feedback is that is operates too slowly for most applications. Applicant's invention replaces a stepping motor with a voice coil actuator with integrated position sensing. The voice coil allows for a faster response and thus shorter equipment use time when performing a procedure.

Generally voice coil actuators do not have position feedback sensing capabilities. Voice coil actuators are generally available in either the moving magnet or moving coil type. The moving coil actuators are also referred to as voice coils.

Typical Linear Voltage Displacement Transducers ("LVDT") have a means to alter the position of the magnetic core. The LVDT converts rectilinear motion of an object to which it is coupled mechanically into a corresponding electrical signal. LVDT linear position sensors can very accurately measure movements as small as a few millionths of an inch up to several inches. The moving element of an LVDT is a separate tube, which is free to move axially in the LVDT's hollow bore and is mechanically coupled to the object whose position is being measured.

In operation, the LVDT's primary winding is energized by alternating current, also called the primary excitation. The LVDT's electrical output signal is the differential AC voltage between the two secondary windings, which varies with the axial position of the core within the LVDT coil.

Applicant's invention places a voice coil adjacent to and in linear alignment with an LVDT sensor. The voice coil provides accurate armature position sensing. The voice coil actuator has a moving magnet armature which contains the magnetic core required for the LVDT. Applicant provides a hole through the center of the voice coil and LVDT to allow a laser beam to pass through the voice coil and LVDT. There is a core tube or moving armature that passes through the voice coil and LVDT and which has a lens adapter and lens at one end. By accurately moving and positioning the moving armature, the laser beam can be quickly and accurately focused through the lens.

DESCRIPTION OF THE PREFERRED EMBODIMENT

Figure 1:
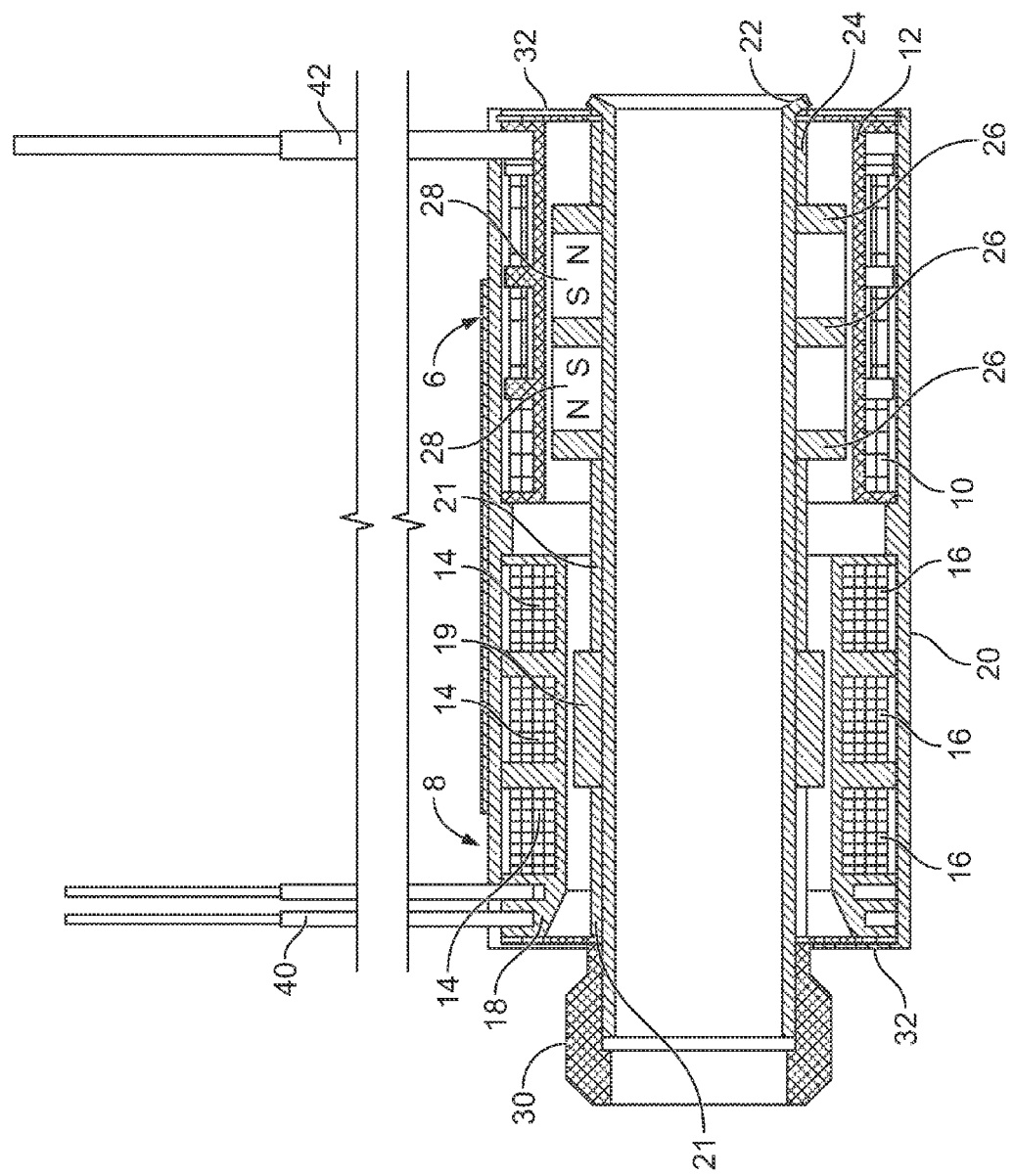
FIG. 1 is a cross sectional view of the LVDT, voice coil, and lens adapter.
Figure 2:
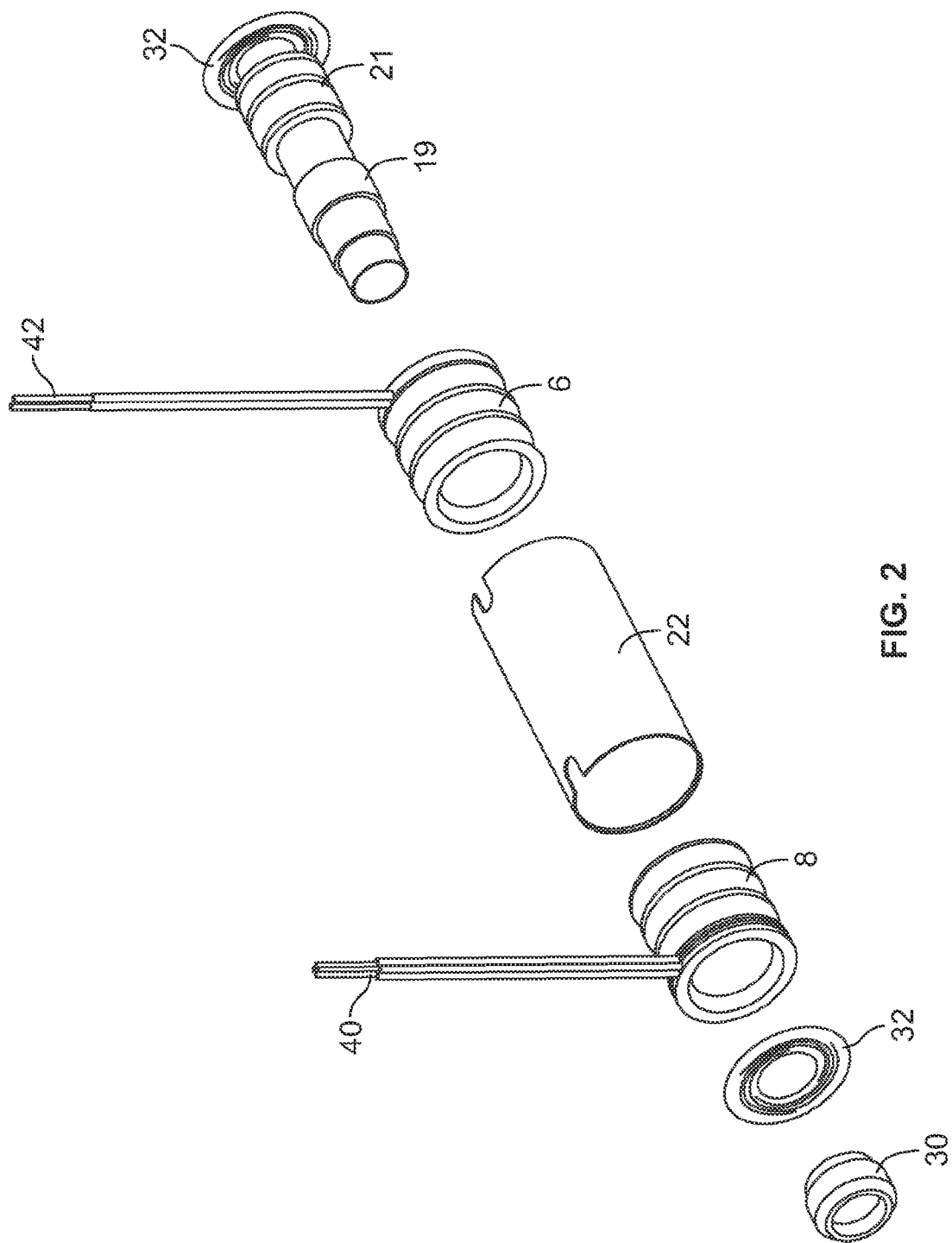
FIG. 2 is an exploded view of the device of FIG. 1.

Turning first to FIG. 1 there are a voice coil 6 and a linear voltage displacement transducer (referred to herein as "LVDT") sensor 8. As seen, these two devices are mounted together as a singular device. There are voice coil windings 10 with multiple coils windings in opposite winding directions for the voice coil 6 which are wound over a voice coil bobbin 12. There are LVDT primary windings 14 wound in the center of the LVDT bobbin 18 and the LVDT secondary windings 16 wound on the outside ends of the LVDT bobbin 18. There is a LVDT core 19 and non magnetic spacers 21 around the LVDT bobbin 18. The LVDT primary windings 14 and secondary windings 16 are housed in a ferromagnetic housing 20.

The voice coil 6 is comprised of a moving armature assembly 21 which consists of a unitary piece non-magnetic core tube 22, which may be made of brass, non-magnetic spacers 24, which also may be made of brass, multiple ferromagnetic armatures 26, and multiple permanent magnets 28 in opposite polarity. The LVDT core tube 22 and lens adapter 30 mount to the apparatus for which the invention is designed to interact with, such as a wand. The core tube 22 extends through the voice coil 6 and LVDT 8 preferably as a singular piece, but can be made of two or more pieces joined together. As can be seen, the lens adaptor 30 is designed to be mounted to the end of tube 22. Two flexures 32, are fixed to the moving armature assembly 21 and the ferromagnetic housing 20 to center the armature assembly 21 within the housing 20 and to keep the armature assembly 21 in the center position when no current is applied to the voice coil 6.

In operation, a voltage is applied through two wires 40 to the primary coil of the LVDT and the output voltage is measured through the two wires 40 from the secondary coil of the LVDT sensor 8. To operate the voice coil, a positive current is applied to the voice coil through wires 42 and the armature assembly 21 moves in one direction. When the current flow to the voice coil 6 is reversed to a negative current, the armature assembly 21 moves in the opposite direction. This is common operation of a voice coil as known in the prior art.

Applicant's invention is particularly well suited for use in devices that require fast and very accurate focusing of a laser beam. There is a hollow passageway 25 through the center of the non-magnetic core tube 22. The hollow passageway 25 passes from one end of the tube 22 to the other and is a straight line from one end to the other. At one end is a laser that emits a beam of light and at the other end a lens 44 is mounted to the lens adapter 30.

When operated with the instrument to which the device is attached, the voice coil actuator 6 moves the position of the lens 44 mounted to the lens adapter 30 by lateral movement of the tube 22 thus refocusing the beam of light from the laser passing through the tube 22 and lens 44. The voice coil 6 provides the armature assembly 21 position feedback to a control system for accurate positioning of the tube 22. In this manner the laser beam can be accurately focused through the lens 44. Furthermore the voice coil 6 and LVDT 8 are a singular piece for easy mounting to the medical apparatus.

Thus there has been provided a combination voice coil actuator and LVDT that has a central passageway through which a laser beam may pass and which can be focused by a lens at the end of the magnetic core tube that extends through the center of the voice coil and LVDT. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A device for focusing a laser comprising:
    a housing;
    a voice coil having a longitudinal axis mounted in the housing;
    a linear voltage displacement transducer ("LVDT") mounted in the housing and having a longitudinal axis, the LVDT mounted adjacent to the voice with the axis of the LVDT in axial alignment with the longitudinal axis of the voice coil;
    an armature assembly centrally disposed in the housing and extending through the voice coil and LVDT, the armature assembly adapted for axial movement in response to energizing the voice coil, and the LVDT providing accurate positioning means for determining the location of the armature assembly;
    a lens mounted at one end of an armature assembly;
    a hollow bore extending through the armature from one end of the armature to the other;
    whereby when a light beam passes through the hollow bore it can be focused by movement of the lens controlled by the voice coil and LVDT.

2. The device of claim 1 wherein the armature is comprised of a unitary hollow core tube that extends through the voice coil and the LVDT with a lens mounting attached to one end of the hollow core tube.

3. The device of claim 2 wherein the hollow bore extends in a straight line from one end of the hollow core tube to the other end.

4. The device of claim 2 wherein the hollow bore is centrally located in the hollow core tube.

5. The device of claim 2 wherein the armature is further comprised of an LVDT core, at least two non-magnetic spacers, multiple ferromagnetic armatures, and multiple permanent magnets in opposite polarity, the non magnetic spacers spacing the ferromagnetic armatures and permanent magnets from the housing.

6. The device of claim 1 and further comprising means for mounting the device to a medical apparatus.

7. A combination voice coil and LVDT comprising:
    a housing in which is mounted a voice coil and LVDT, the voice coil and LVDT in axial alignment with each other with one end of the voice coil adjacent to an end of the LVDT;
    a common armature assembly extending axially through the voice coil and LVDT, the armature assembly adapted for axial movement in response to energizing the voice coil with one end of the armature assembly extending out past the an end of the voice coil;
    a hollow bore extending through the armature from one end of the armature to the other;
    the LVDT providing accurate positioning means for determining the location of the armature assembly;
    a lens mounted on the end of the armature assembly that extends out past the end of the voice coil;
    whereby when a light beam passes through the hollow bore it can be focused by movement of the lens controlled by the voice coil and LVDT.

8. The combination voice coil and LVDT of claim 7 and further comprising means for mounting a laser at the end of the armature assembly opposite the end that extends out past the end of the voice coil.

9. The combination voice coil and LVDT of claim 7 and further comprising means for mounting the combination voice coil and LVDT to a medical apparatus.

10. The combination voice coil and LVDT of claim 7 wherein the hollow bore extends in a straight line from one end of the armature to the other end.

11. The combination voice coil and LVDT of claim 10 wherein the hollow bore is centrally located in the armature.

12. The combination voice coil and LVDT of claim 7 wherein the armature is further comprised of an LVDT core, at least two non-magnetic spacers, multiple ferromagnetic armatures, and multiple permanent magnets in opposite polarity, the non magnetic spacers spacing the ferromagnetic armatures and permanent magnets from the housing.

* * * * *